United States Patent [19]

Sperry et al.

[11] Patent Number: 4,568,003
[45] Date of Patent: Feb. 4, 1986

[54] DETACHABLE MIXING CHAMBER FOR A FLUID DISPENSING APPARATUS

[75] Inventors: Charles R. Sperry, Westport, Conn.; Paul J. Bladyka, Springfield, Vt.

[73] Assignee: Sealed Air Corporation, Saddle Brook, N.J.

[21] Appl. No.: 638,752

[22] Filed: Aug. 8, 1984

Related U.S. Application Data

[62] Division of Ser. No. 298,456, Sep. 2, 1981, Pat. No. 4,469,251.

[51] Int. Cl.⁴ .................. B67D 5/60; G01F 11/28
[52] U.S. Cl. ...................... 222/145; 222/148; 222/448; 239/112; 239/118; 239/433; 239/591
[58] Field of Search ............ 222/145, 135, 148, 136, 222/144.5, 482; 239/112, 118, 412, 414, 433, 117, 390, 591, 431; 422/133, 225; 277/12, 32, 236

[56] References Cited

U.S. PATENT DOCUMENTS 3,263,928  8/1966  Gusmer .
3,784,110  1/1974  Brooks ..................... 239/304
3,930,619  1/1976  Levey et al. ............... 239/526
4,023,733  5/1977  Sperry ..................... 239/112
4,083,474  4/1978  Waite et al. ............... 222/145
4,196,160  4/1980  Sperry ..................... 264/40.4
4,344,919  8/1982  Kelkerbaum ................ 422/133

Primary Examiner—Joseph J. Rolla
Assistant Examiner—Andrew Jones
Attorney, Agent, or Firm—Lerner, David, Littenberg, Krumholz & Mentlik

[57] ABSTRACT

A detachable mixing chamber is constructed and arranged to receive a plurality of fluid components from a source thereof for forming a fluid such as a foam to be discharged therefrom. The chamber includes a core having a bore therein and a plurality of inlet openings arranged in communication with the bore for supplying the fluid components from such source to the bore and means for maintaining the core under a restraining force in an axial and radial direction. The chamber is removably secured to a dispensing apparatus in a manner to be accessible from the outside thereof for detachment therefrom.

21 Claims, 8 Drawing Figures

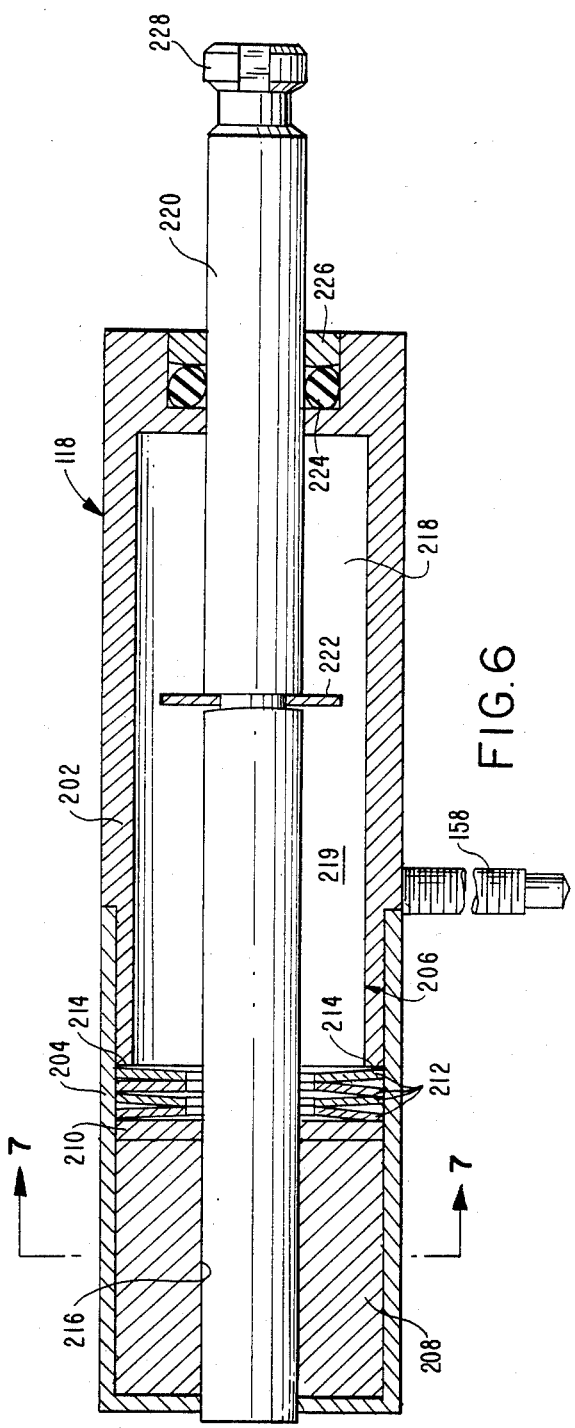
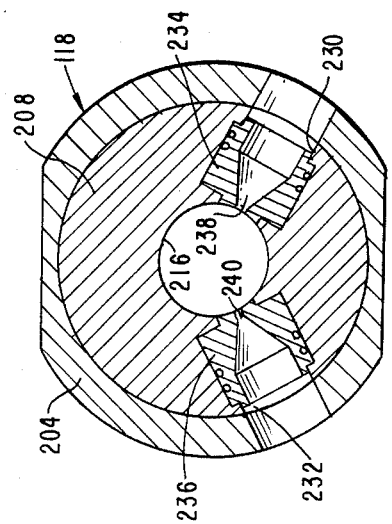
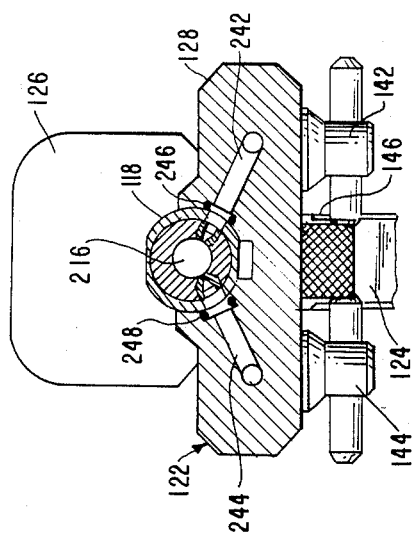

DETACHABLE MIXING CHAMBER FOR A FLUID DISPENSING APPARATUS

This is a division of application Ser. No. 298,456, filed 9/2/81, now U.S. Pat. No. 4,469,251.

BACKGROUND OF THE INVENTION

The present invention relates in general to an apparatus for mixing and dispensing of synthetic foams, and more particularly, to a mixing chamber for such apparatus which is adapted to be removably secured in operative association with the control means of such apparatus in a manner to be accessible from the outside of such apparatus for detachment therefrom.

As is well-known to those skilled in the art, the preparation of many synthetic foams, such as polyurethane foams, requires uniform mixing of liquid organic resins with polyisocyanates in a so-called mixing chamber. In this regard, it is often desirable to dispense the polyisocyanate resin mixture into a receptacle, such as a package or the like, before it is reacted to form the polyurethane foam, particularly when attempting to build up a foam structure around an object as in packaging. One particular problem associated with the handling of polyurethane foam is that the organic resin and polyisocyanate tend to react relatively rapidly, and can accumulate in the openings through which the organic resin and polyisocyanate are supplied to the mixing chamber. The accumulated foam in these openings are then most difficult to remove, generally requiring the disassembling of the apparatus for cleaning of the mixing chamber before continued use is possible.

It has been considered desirable, but never commercially feasible, to incorporate the dispensing apparatus in a system for packaging objects. In this regard, the dispensing apparatus would be located at one or more work stations overlying a conveyor belt and positioned in a downwardly-facing direction. Objects to be packaged would be indexed along the conveyor belt and subsequently stopped at each work station under the dispensing apparatus. The dispensing apparatus is activated to fill each receptacle with polyurethane foam so as to encapsulate the object therein. Because the openings in communication with the mixing chamber become obstructed with accumulations of polyurethane foam, dispensing apparatus will generally become inoperable. In particular, the accumulation of foam therein will prevent the proper controlled flow of organic resin or polyisocyanate to the mixing chamber for production of suitable polyurethane foam. Once this condition has occurred, the dispensing apparatus must be disassembled and the mixing chamber cleaned prior to continued operation. As thus far described, the disassembling of the dispensing apparatus results in unnecessary system interruption and the associated loss of productivity and has thus made automated dispensing apparatus unfeasible.

In accordance with one known prior art dispensing apparatus, the mixing chamber is formed from a "Teflon" core having a bore longitudinally extending therethrough and a plurality of openings arranged therein in communication with the bore for supplying the organic resin and polyisocyanate thereto. A valving rod is slideably provided in interference fit within the bore to control the flow of organic resin and polyisocyanate from the openings into the bore and the subsequent discharge of the foam therefrom. Such interference fit between the valving rod and bore of the mixing chamber often results in the "cold forming" of the "Teflon" material forming such bore and openings therein. The cold forming of the "Teflon" material causes the loss of the interference fit resulting in the inability of the valving rod to effectively seal the openings to prevent the leakage of organic resin and polyisocyanate into the bore of the mixing chamber where they ultimately react to obstruct the mixing chamber with polyurethane foam, rendering the dispensing apparatus generally inoperable. Once this condition has occurred, the dispensing apparatus must be disassembled such that the mixing chamber can be replaced or rebuilt prior to continued operation of the dispensing apparatus.

Accordingly, it can be appreciated that there is a need for a dispensing apparatus which incorporates a mixing chamber which is readily detachable therefrom for replacement thereof with a minimum of system disruption and associated loss of productivity. Further, it can also be appreciated that there is a need for a mixing chamber incorporating a core constructed of "Teflon" or other such material which overcomes the associated problems with cold forming of such material during operation of the dispensing apparatus, i.e., loss of interference fit between the valving rod and bore of the mixing chamber.

SUMMARY OF THE INVENTION

It is broadly an object of the present invention to provide a detachable mixing chamber for a fluid dispensing apparatus which overcomes or avoids one or more of the foregoing disadvantages resulting from the use of the above-mentioned foam dispensing apparatus and which fulfills the requirements for preventing cold forming of the core of the mixing chamber and the maintaining of an interference fit between the bore of such core and a valving rod inserted therein. Specifically, it is within the contemplation of the present invention to provide a detachable mixing chamber adapted to receive a plurality of fluid components from a source thereof for forming a fluid to be discharged therefrom, including a core having a bore therein and a plurality of inlet openings arranged in communication with the bore for supplying the fluid components from such source to the bore and means for maintaining the core under a restraining force in an axial and radial direction.

A further object of the present invention is to provide a detachable mixing chamber for use in a foam dispensing system which can be readily removed for replacement thereof in a manner which will minimize interruption of the operation of such system and the associated loss of productivity.

A still further object of the present invention is to provide a mixing chamber incorporating a core of "Teflon" or other such material which overcomes the problem of cold forming associated with such mixing chambers in accordance with the above-mentioned prior art foam dispensing apparatus.

In accordance with one embodiment of the present invention, there is provided a dispensing apparatus for discharging a fluid therefrom, including a chamber adapted to receive a plurality of the fluid components from a source thereof to form the fluid therein. Control means are provided for controlling the supplying of the fluid components to the chamber and the discharging of fluid therefrom. The chamber is constructed and arranged in operative association with the control means in a manner to be detachable therefrom.

Further in accordance with the above embodiment, the chamber of the dispensing apparatus includes a pair of inlet openings arranged in radial alignment in other than opposed relationship for supplying the fluid components from a source thereof to the chamber in response to the control means.

Still further in accordance with the above embodiment, the chamber of the dispensing apparatus includes a core having an axial bore longitudinally extending therethrough and a pair of inlet openings arranged in the core in communication with the bore for supplying the fluid components from a source thereof to the bore for forming the fluid therein in response to the control means. In addition, the chamber is constructed to include means for maintaining the core under a restraining force in an axial and radial direction.

Yet still further in accordance with the above embodiment, the chamber of the dispensing apparatus is accessible from the outside of the dispensing apparatus for detachment thereof from the control means.

BRIEF DESCRIPTION OF THE DRAWINGS

The above description, as well as further objects, features and advantages of the present invention, will be more fully understood by reference to the following detailed description of a presently preferred, but nonetheless illustrative detachable mixing chamber for a fluid dispensing apparatus in accordance with the present invention when taken in conjunction with the accompanying drawings, wherein:

FIG. 6 is a partial cross-sectional side elevation of the detachable mixing chamber as shown in FIG. 4 wherein such chamber is shown to include means for maintaining the core thereof under a restraining force in an axial and radial direction, and further showing such chamber including a reservoir containing a solvent for the polyurethane foam;

FIG. 7 is a cross-sectional side elevation taken along line 7—7 of FIG. 6 showing the detachable mixing chamber including a pair of inlet openings formed from an inlet member in the core adapted to maintain the dimensions and shape thereof during use of the dispensing apparatus; and, FIG. 8 is a cross-sectional side elevation taken along line 8—8 of FIG. 5 showing the detachable mixing chamber removably secured to the dispensing apparatus wherein the inlet openings are arranged in communication with passageways provided in the fluid dispensing apparatus for supplying the organic resin and polyisocyanate to the bore formed in the core of the mixing chamber.

DETAILED DESCRIPTION OF THE PREFERRED EMBODIMENT

Figure 1:
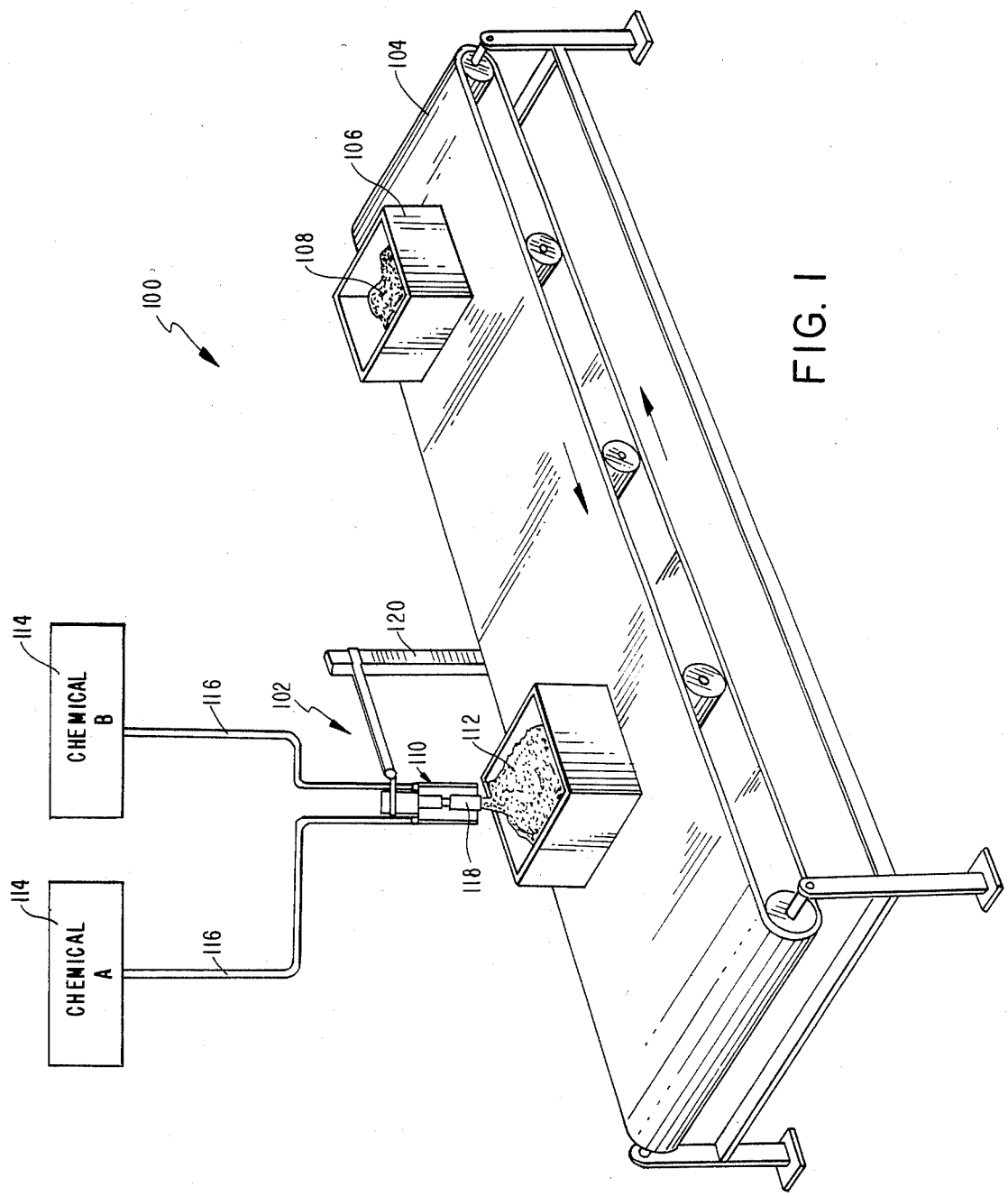
FIG. 1 is a perspective view of a fluid dispensing system including a work station provided with a fluid dispensing apparatus having a detachable mixing chamber in accordance with the present invention.

Referring now to the drawings in which like reference characters represent like elements, there is shown in FIG. 1 a foam dispensing system designated generally by reference character 100. The foam dispensing system 100 includes at least one work station 102 located along a conveying apparatus 104. The conveying apparatus 104 transfers receptacle 106 having an object 108 therein to be packaged from a remote location to the work station 102. Located at each work station 102, there is provided a foam dispensing apparatus 110 for mixing and dispensing of chemical reactants in forming a polyurethane foam 112. The construction and operation of the dispensing apparatus 110 in accordance with the present invention will be described hereinafter. In this regard, the operation of the dispensing apparatus in accordance with the present invention is generally similar to the operation of the dispensing apparatus disclosed and described in the U.S. patent application Ser. No. 159,369, filed June 13, 1980, and assigned to the same assignee of the present invention now abandoned.

The chemical reactants for the polyurethane foam 112 are dispensed from suitable containers 114, respectively containing a liquid organic resin designated as chemical A and a polyisocyanate designated as chemical B. Chemicals A and B are each supplied to the dispensing apparatus 110 through suitable feed lines 116. The organic resin and polyisocyanate are mixed within a detachable mixing chamber 118 removably secured to the dispensing apparatus 110 to form the polyurethane foam 112 which is discharged therefrom.

There will now be described a general explanation of the operation of the foam dispensing system 100. The conveying apparatus 104 indexes receptacles 106 to the work station 102 under the dispensing apparatus 110, which is now positioned over the receptacle 106. The dispensing apparatus 110 is mounted to a fixture 120 which allows movement of the dispensing apparatus over the receptacle 106 in a desired manner. The fixture 120 can be constructed of an assembly known to those skilled in the art, such as that disclosed in the U.S. Pat. No. 4,196,160 which is incorporated by reference herein.

As the conveying apparatus 104 positions each receptacle 106 under the dispensing apparatus 110, the dispensing apparatus is activated to discharge polyurethane foam 112 from the mixing chamber 118 into the receptacle so as to encapsulate the object 108. The fixture 120 is operatively moved such that the polyurethane foam 112 fills all voids in the receptacle 106 and completely encapsulates the object 108. The movement of the dispensing apparatus 110 by the fixture 120 may be by manual manipulation or by programmed control. Upon filling of the receptacle 106 with polyurethane foam 112, the foam dispensing operation is terminated.

Although the foam dispensing system 100 has been described with reference to packaging objects, it is evident to one skilled in the art that such system may be incorporated for other purposes. For example, the foam dispensing system 100 can be used for depositing polyurethane foam 112 into preshaped dies for forming shaped objects therefrom.

Figure 2:
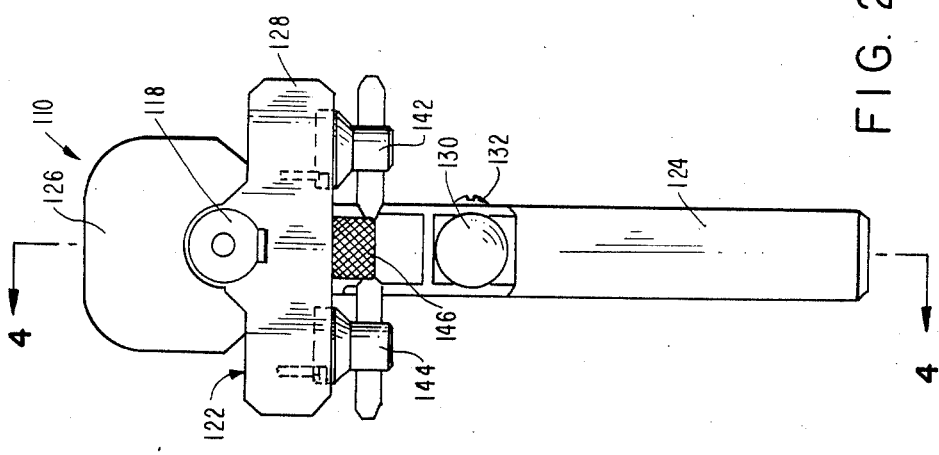
FIG. 2 is a front elevation of the fluid dispensing apparatus as shown in FIG. 1 having a detachable mixing chamber removably secured thereto.

A description of the dispensing apparatus 110 for dispensing one or more fluids and which is particularly well suited, although not limited thereby, for mixing two liquids such as a liquid organic resin and a liquid polyisocyanate, which react to form a polyurethane foam 112, will now be described initially with reference to FIGS. 2 and 3. The dispensing apparatus 110 generally includes a control assembly generally designated by reference numeral 122 and a detachable mixing chamber 118, the control assembly 122 is adapted to control the supplying of organic resin and polyisocyanate to the mixing chamber 118 and the discharging of the polyurethane foam 112 therefrom. The control assembly 122 is externally constructed from a handle section 124, a hollow barrel section 126 and a head section 128. The barrel section 126 and head section 128 are secured to the handle section 124 in a manner to be described hereinafter. A trigger 130 is provided in the control assembly 122 attached to the handle section 124 via screw 132.

Figure 3:
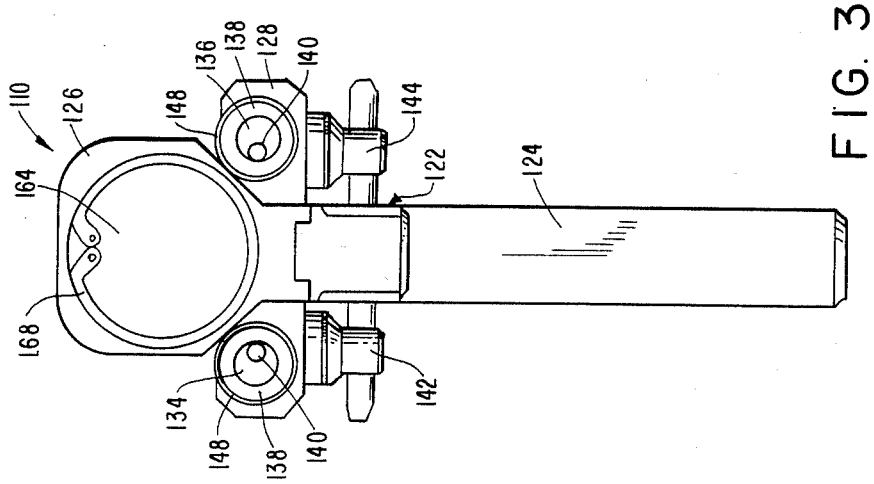
FIG. 3 is a rear elevation of the fluid dispensing apparatus as shown in FIG. 2 wherein such apparatus is shown having means for supplying organic resin and polyisocyanate to the mixing chamber of such apparatus.

As shown in FIG. 3, a pair of liquid entry openings 134, 136 are fomed in the head section 128 extending along opposite sides thereof and having a sleeve 138 inserted therein of Teflon or other such suitable material which will not be chemically attacked by the organic resin or polyisocyanate. At the terminal end of the liquid entry openings 134, 136, within the head section 128, are provided openings 140 in communication with a pair of control valves 142, 144 for controlling the respective supplying of liquid organic resin and polyisocyanate from a source thereof to the mixing chamber 118, which chamber is removably secured to the head section 118 via knob 146. The source of liquid organic resin and polyisocyanate are respectively introduced into the liquid entry openings 134, 136 via liquid connectors 148 provided in the head section 128 in communication with the liquid entry openings 134, 136.

Figure 4:
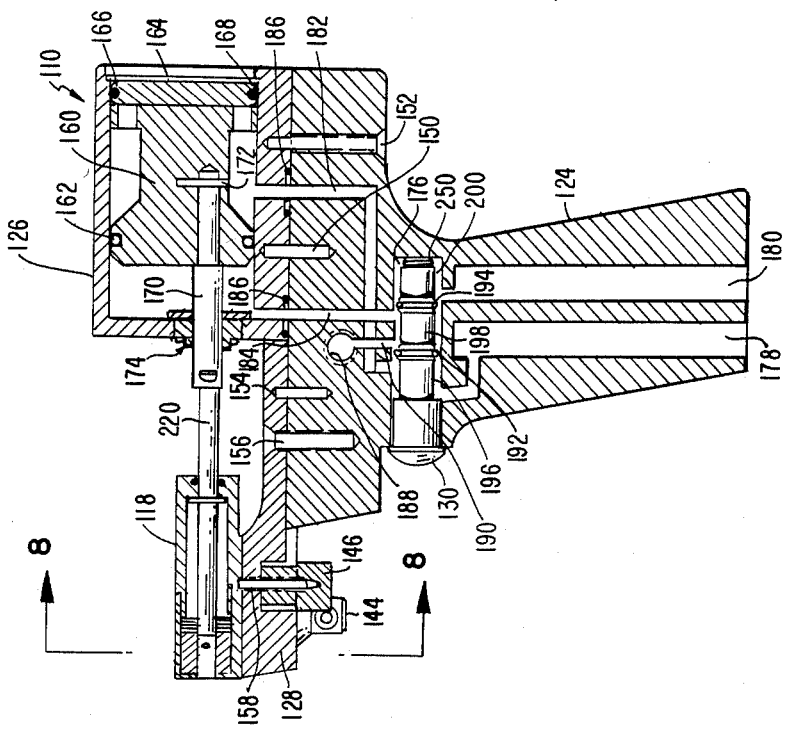
FIG. 4 is a partial cross-sectional side elevation taken along line 4—4 of the fluid dispensing apparatus as shown in FIG. 3 wherein such apparatus is shown in an inoperative position to prevent discharge of fluid therefrom.

Referring to FIG. 4, the internal construction of the control assembly 122, in particular the handle section 124 and the barrel section 126, will now be described in detail. The barrel section 126 is secured to the top of the handle section 124 by an alignment pin 150 and a threaded bolt 152. Likewise, the head section 128 is secured to the top of the handle section 124 by an alignment pin 154 and a threaded bolt 156. The mixing chamber 118 is removably secured to the top portion of the head section 128 by the engagement of the knob 146 with a threaded rod 158 secured to the mixing chamber and extending through an opening provided in the head section. the handle section 128 of the control assembly 122 has been generally described with reference to FIGS. 2 and 3. The attachment of the mixing chamber 118 to the head section 128 in a manner to communicate with the liquid entry openings 134, 136 via control valves 142, 144 to a source of liquid organic resin and polyisocyanate will be described hereinafter with reference to FIG. 8. The barrel section 126 of the control assembly 122 includes a movable piston 160 slideably arranged within the bore of the barrel section. The piston 160 includes an O-ring 162 circumferentially circumscribing one end thereof in a manner to engage the inner surface of the barrel section 126 to form a seal thereto. The open end of the barrel section 126 is sealed by a plug 164 having an O-ring 166 circumferentially circumscribing the plug to form a seal to the inner surface of the barrel section. The plug 164 is retained within the barrel section 126 via a retaining clip 168 as best shown in FIG. 3. The piston 160 is pneumatically driven within the barrel section 126 and controls the movement of a piston rod 170 secured within the piston by a retaining pin 172. The piston rod 170 extends through a seal assembly 174 provided at the forward end of the barrel section 126. The seal assembly 174 is generally constructed from one or more O-rings and retaining rings to provide a sliding seal for the piston rod 170. A full description of the nature of operation for moving the piston 160 by means of a pressurized source is generally provided in U.S. Pat. No. 4,023,733 which patent is thereby incorporated by reference.

The handle section 124 of the control assembly 122 will now be described. The handle section 124 includes a bore 176 which receives the trigger 130 and which communicates with the surrounding atmosphere by channels 178, 180 formed in the lower section of the handle section. The bore 176 is further provided in communication with the interior of the barrel section 126 by passageways 182, 184. The passageways 182, 184 are formed within the handle section 124 and barrel section 126 including an O-ring seal 186 provided at the interface between the handle section and barrel section where the passageways are maintained in aligned relationship by the alignment pin 150. A source of pressurized gas is supplied to the handle section 124 via opening 188 and supplied to the bore 176 by passageway 190. A pair of O-ring seals 192, 194 are provided on the trigger 130 within the bore 176 to divide the bore into a left annular chamber 196, a middle annular chamber 198 and a right annular chamber 200.

The construction of the detachable mixing chamber 118 will now be described generally with reference to FIGS. 6 and 7. Specifically referring to FIG. 6, the mixing chamber 118 is constructed from first and second shell halves 202, 204 formed of stainless steel or other such suitable metal material which will not be chemically attacked by the organic resin, polyisocyanate or polyurethane foam, in addition to withstanding the mechanical stresses imparted thereon during operation of the dispensing apparatus 110. The first and second shell halves 202, 204 are arranged in colinear alignment as illustrated in FIG. 6 to form a longitudinally extending cavity 206 therein. A core 208 of "Teflon" or other such suitable material is inserted in the left side of the cavity 206 formed by the second shell half 204. The core 208 is confined within the cavity 206 by the walls forming the second shell half 204 and a retaining plate 210.

The core 208 is maintained under a restraining or compressive force in an axial and radial direction by the walls of the second shell half 204 and the retaining plate 210 being urged against the core by a plurality of compressed Belleville washers 212 maintained in their appropriate location by the lip 214 formed at the sealed mating portion of the first and second shell halves 202, 204. The core 208 is provided with an axial bore 216 longitudinally extending therethrough in communication with the exterior of the mixing chamber 118 and a reservoir 218 formed within the right side of the cavity 206 defined generally by the first shell half 202. Contained within the reservoir 218 is a cleaning fluid or solvent 219 for the polyurethane foam such as "Cello Solve" solvent.

A valving rod 220 longitudinally extends through the reservoir 218 and is slidably received in interference fit within the bore 216 of the core 208. A stop ring 222 is secured around the valving rod 220 within the reservoir 218. The first shell half 202 is provided with an opening through which the valving rod 220 moves and which is sealed thereto by an O-ring 224 and a retaining ring 226. The valving rod 220 is suitably constructed at one end 228 thereof to releasably engage the piston rod 170 in the manner as illustrated in FIG. 4.

Referring to FIG. 7, the mixing chamber 118 includes a pair of apertures 230, 232 extending radially therethrough in communication between the exterior of the mixing chamber and the bore 216 of core 208. Inserted within each of the apertures 230, 232 is an inlet member 234, 236 of stainless steel or other such suitable material as noted above, having an inlet opening 238, 240 in communication with the bore 216.

The inlet openings 238, 240 provide for the entry of the organic resin and polyisocyanate into the bore 216 of the mixing chamber 118 to form the polyurethane foam 112 therein. In this regard, it is desirable that the inlet openings 238, 240 be arranged with respect to each other to provide optimum mixing of the organic resin and polyisocyanate within the bore 216, yet at the same time, to avoid the problem referred to as "cross-over". Cross-over is the condition wherein, for example, organic resin entering through inlet opening 238 crosses over the bore 216 and interacts chemically with the polyisocyanate entering through the inlet opening 240 to form polyurethane foam 112 at the mouth of the inlet opening 240 in a manner to cause polyurethane foam accumulations thereat. The accumulation of polyurethane foam 112 at one of the inlet openings 238, 240 often prevents the proper controlled flow of the organic resin or polyisocyanate to the bore 216 for production of suitable polyurethane foam 112 therein. Once this condition has occurred, the mixing chamber 118 must be removed from the dispensing apparatus 110, disassembled and the mixing chamber cleaned or replaced prior to continued operation.

It has been found that the problems described above in regard to cross-over of the organic resin or polyisocyanate can be effectively overcome by arranging the inlet openings 238, 240 in radial alignment in other than opposed relationship. Specifically, it has been found that arranging the inlet openings 238, 240 radially spaced from each other in the range of about 120 to 130 degrees minimizes the above-mentioned cross-over problem and maximizes the mixing efficiency between the organic resin and polyisocyanate within the bore 216 of the mixing chamber 118. In accordance with the preferred embodiment, it has been found that the preferred radial spacing for the inlet openings 238, 240 is in the amount of approximately 125 degrees. Although the inlet openings 238, 240 have been described as being arranged in radial alignment and spaced from each other in the above manner, it is contemplated that such openings may be arranged in other relationships without departing from the spirit and scope of one aspect of the present invention.

The inlet members 234, 236 are generally constructed of stainless steel which, in addition to being chemically inert to the organic resin, polyisocyanate or polyurethane foam, also maintain their dimensions and shape during operation of the mixing chamber 118. It has been found that the interference fit between the so-called valving rod and the bore of the prior art dispensing apparatus resulted in the cold working of the "Telfon" material forming the core resulting in extrusion of such material out through the opening thereof, thereby causing loss of the interference fit and, in addition, causing cold forming of the apertures provided in the core. These disadvantages resulting from the use of a core of "Telfon" or other such material has been overcome in accordance with the present invention by maintaining the core 208 under a restraining or compressive force in the radial and axial direction.

As described, such restraining or compressive forces result from the core 208 being dimensionally stabilized by the walls of the second shell half 204 and the compressive force imposed on the core by the Belleville washers 212 acting upon the retaining plate 210. In addition, the construction of the inlet members 234, 236 of stainless steel or other such suitable metal material results in the inlet openings 238, 240 retaining their dimensions and shape during operation by avoiding the problems associated with the cold forming of the "Telfon" core 208. As such, it has been found that the prior art dispensing apparatus as noted above required the rebuilding of the mixing chamber after approximately two thousand pounds of polyurethane foam had been produced by the dispensing apparatus whereas the mixing chamber 118 of the present invention has been found to allow the production of approximately twenty thousand pounds of polyurethane foam before the necessity of rebuilding such chamber. The ability of the mixing chamber 118 of the present invention to provide a tenfold output of polyurethane foam 112 prior to being rebuilt minimizes the system interruption and the associated loss of productivity, not to mention the associated cost of rebuilding the mixing chamber 118.

The mixing chamber 118 is removably secured to the control assembly 122 in a manner to be accessible from outside of the dispensing apparatus 110 for detachment thereof from the control assembly. Specifically referring to FIG. 8, the mixing chamber 118 is shown removably secured to the head section 128 of the control assembly 122 by the engagement of the knob 146 with the threaded rod 158 of the detachable mixing chamber 118. The mixing chamber 118 is arranged such that the apertures 230, 232 are provided in communication with passageways 242, 244 formed in the head section 128 which respectively communicate with the control valves 142, 144 for the organic resin and polyisocyanate O-rings 246, 248 provide within a recessed portion surrounding the mouth of the passageways 242, 244 provide a seal between the passageways and the mixing chamber 118 at the respective apertures 230, 232. In this regard, organic resin or polyisocyanate from the control valves 242, 244 can be supplied to the bore 216 of the mixing chamber 118 via the passageways 242, 244 and the inlet openings 238, 240. As is readily apparent from the above description of the construction of the detachable mixing chamber 118 and its being accessible from outside of the dispensing apparatus 110, the chamber is readily detachable therefrom by unscrewing the knob 146 thereby allowing replacement of the mixing chamber with a minimum of system interruption and loss of associated productivity.

The operation of the dispensing apparatus 110 in a dispensing system 100 as shown generally in FIG. 1 will now be described. Referring to FIG. 3 in operation of the dispensing apparatus 110, a pressurized source of liquid organic resin and polyisocyanate is coupled to the liquid entry openings 134, 136 via liquid connectors 148. The organic resin and polyisocyanate, from their respective containers 114, fill the liquid entry openings 134, 136 under pressure. In addition, the organic resin and polyisocyanate, from their respective liquid entry openings 134, 136, fill the passageways 242, 244 in communication with the inlet openings 238, 240 upon opening of the respective control valves 142, 144. In this regard, a continuous supply of organic resin and polyisocyanate is supplied to the bore 216 of the mixing chamber 118 via the liquid entry openings 134, 136, control valves 142, 144, passageways 242, 244 and inlet openings 238, 240.

A source of pressurized gas is connected to opening 188 which communiciates with the bore 176 in which the trigger 130 is inserted via passageway 190. The trigger is maintained in an outwardly extending position by the action of a bias spring 250 inserted within the bore 176. The trigger 130 is operative to communicate the pressurized gas from passageway 190 alternatively to one of passage way 182, 184 while maintaining the other passageway at substantially atmospheric conditions. As shown in FIG. 4, a dispensing apparatus 110 is shown in an inoperative position. The trigger 130 is maintained in an outward position such that passageway 182 is in communication with the middle annular chamber 198 which is pressurized by its communication with passageway 190 and opening 188. The pressurized gas from passageway 182 operates to slide the movable piston 160 within the hollow barrel section 126 as shown. Movement of the piston 160 is aided by the barrel section 126 to the left of the piston being maintained at substantially atmospheric pressure via passageway 184 and its communication to the external atmosphere via the right annular chamber 200 and channel 180. The movement of the movable piston 160 as described causes the valving rod 220 to assume a closed position in the mixing chamber 118 such that its forward end extends past the inlet openings 238, 240 in the core 208 of the mixing chamber 118 thereby preventing the flow of organic resin or polyisocyanate into the bore 216 of the mixing chamber from the inlet openings.

Figure 5:
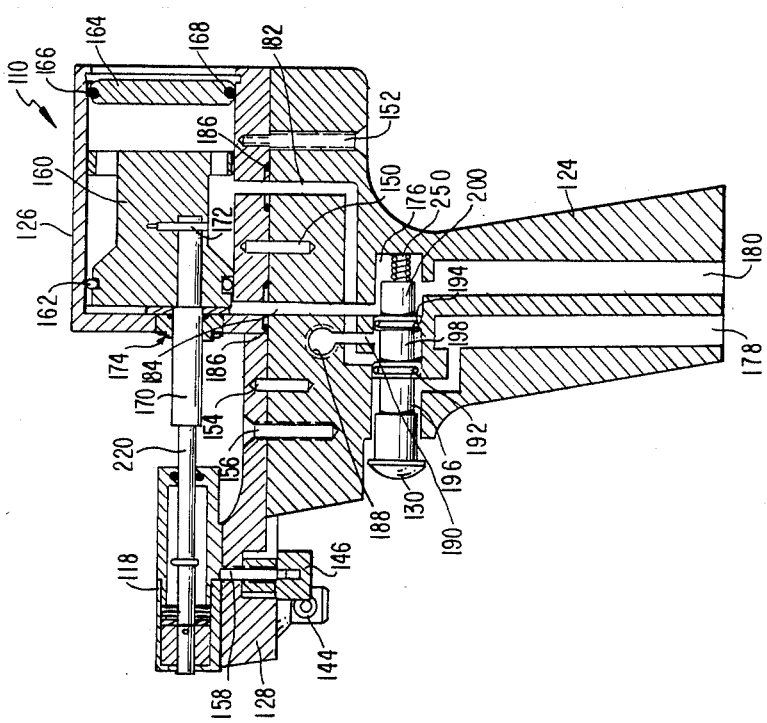
FIG. 5 is a partial cross-sectional side elevation of the fluid dispensing apparatus as shown in FIG. 4 wherein such apparatus is shown in an operative position for discharging a fluid therefrom.

In order to activate the dispensing apparatus 110 for mixing or spraying, the control valves 142, 144 are opened and the trigger 130 is then pressed inward, see FIG. 5, to move the piston 160 to its rearward position adjacent the plug 164. As the piston 160 moves backward, the valving rod 220 is retracted and moves past the inlet openings 238, 240 in the bore 216, thereby permitting the inflow of pressurized organic resin and polyisocyanate. The valving rod 220 moves within the reservoir 218 except for the front end thereof which is maintained within the bore 216 thereby functioning to seal off the reservoir by closing the back end of the bore defined in the core 208 for the liquid inrush. When polyisocyanate and organic resin flow into the bore 216 of the mixing chamber 118, they will mix due to their respective pressure, and will be forced or sprayed outward from the tip of the dispensing apparatus 110. The movement of the valving rod 220 is restricted by the stop ring 222 engaging the rear wall of the first shell half 202 of the mixing chamber 118. As such, the valving rod 220 is prevented from being removed totally from the bore 216 defined in the core 208 of the mixing chamber 118. During the dispensing of the polyurethane foam 112, that portion of the valving rod 220 which had previously been within the bore 216 to seal the mouth of the inlet openings 238, 240 is now in contact with the solvent 219 within reservoir 218. The solvent 219 removes any accumulated polyurethane foam 112 therefrom which would otherwise clog the inlet openings 238, 240 and render the dispensing apparatus partially or totally inoperative.

The movement of the piston 160 in a rearward direction is accomplished in a similar manner to the movement of the piston in a forward direction. The pressing inward of the trigger 130 causes passageway 182, which had previously been pressurized and in communication with the middle annular chamber 198, to be vented to the surrounding atmosphere via its communication with the first annular chamber 196 and channel 178. Passageway 184 now becomes pressurized by its communication with the middle annular chamber 198 and the pressurized gas via channel 190 while being isolated from the surrounding atmosphere through channel 180 via the O-ring seal 194. Accordingly, it is seen that the pressurized gas via the movement of the trigger 130 is operative to move the piston 160 in a sliding back and forth motion to move the valving rod 220 into and out of the bore 216 of the mixing chamber 118 to either allow or prevent the inrush of organic resin and polyisocyanate thereto in the formation of polyurethane foam 112.

When it is desired to stop the dispensing, either the operator or some mechanical means releases the trigger 130 and the air pressure built up in the passageway 182 causes the piston 160 and the valving rod 220 to move forwardly, and the valving rod closes off the liquid inlet openings 238, 240 a shown in FIG. 4. The operation of the despensing apparatus 10 can be controlled in a manner known to those skilled in the art. Thus, as each receptacle 106 is indexed to the work station 102 under the dispensing apparatus 110, the dispensing apparatus is activated to discharge polyurethane foam 112 into each receptacle. From the foregoing it can be appreciated that, if the occasion arises, the mixing chamber 118 can be readily and quickly detached from the control means 122 by simply unscrewing knob 146 which holds the mixing chamber thereto. The ability to quickly replace mixing chambers by the simple and quick unscrewing of a single knob minimizes system downtime and the associated loss of productivity.

In accordance with the present invention, there has been presented a dispensing apparatus 110 for discharging a foam 112 therefrom. The dispensing apparatus 110 is constructed from a chamber 118 adapted to receive a plurality of fluid components from a source thereof to form the foam 112 therein. The chamber 118 includes a core 208 having a bore 216 extending therethrough and a plurality of inlet openings 238, 240 arranged in communication with the bore for supplying the fluid components from the source to the bore. A control assembly 122 is provided for controlling the supplying of the fluid components from the source to the bore 216 and discharging of the foam 112 therefrom. The chamber 118 is constructed and arranged in operative association with the dispensing apparatus 110 in a manner to be detachable from the control assembly 122 and the source of the fluid components.

Still further in accordance with the present invention, there has been presented a chamber 118 adapted to receive a plurality of fluid components from a source thereof for forming a foam 112 to be discharged therefrom. The chamber 118 is constructed from a core 208 having an axial bore 216 longitudinally extending therethrough and a pair of inlet openings 238, 240 arranged in the core in communication with the bore for supplying the liquid component from the source to the bore. The pair of inlet openings 238, 240 are arranged in radial alignment in the core 208 in other than opposed relationship and constructed from inlet members 234, 236 adapted to maintain the dimensions thereof during use of the chamber 118. Further, means are provided for maintaining the core 208 under a restraining force in an axial and radial direction.

Although the invention herein has been described with reference to particular embodiments, it is to be understood that these embodiments are merely illustrative of the principles and application of the present invention. It is to be understood that numerous modifications may be made in the illustrative embodiments and other arrangements may be devised without departing from the spirit and scope of the present invention as defined by the appended claims.

What is claimed is:

1. A mixing chamber adapted to receive a plurality of fluid components from respective sources thereof for forming a foam to be discharged therefrom comprising, a core of deformable material having an axial bore longitudinally extending therethrough and a pair of inlet openings arranged in said core in communication with said bore for supplying said fluid components from said respective sources to said bore, a housing of nondeformable material surrounding said core, inlet members inserted into said inlet openings within said core and constructed of nondeformable material so as to maintain the dimensions thereof during use of said chamber, and maintaining means for maintaining said core under a restraining force.

2. The chamber as set forth in claim 1 wherein said chamber is constructed and arranged to be removably secured in operative association with the control means of a dispensing apparatus and said source of said fluid components in a manner to be detachable therefrom from outside of said dispensing apparatus.

3. The chamber as set forth in claim 1 further including a reservoir adapted to receive a solvent for said fluid.

4. The chamber as set forth in claim 3 further including a longitudinally extending rod slideably arranged in interference fit within said bore and extending into said reservoir for contact with said solvent therein.

5. The chamber as set forth in claim 1 wherein said core is constructed of "Teflon" material.

6. The chamber as set forth in claim 1 further including a retaining plate positioned between said core and said maintaining means.

7. The chamber as set forth in claim 6, wherein said core is of unitary construction.

8. The chamber as set forth in claim 6, wherein said retaining plate and said maintaining means are arranged within a space provided between one end of said core and a portion of said housing.

9. The chamber as set forth in claim 8, wherein said portion of said housing includes a lip engaging said maintaining means, whereby said maintaining means exerts said continuous compressive spring force against said retaining plate.

10. The chamber as set forth in claim 1, wherein said housing is constructed of a first and second half joined together, said first half containing a solvent for said fluid and said second half containing said core.

11. The chamber as set forth in claim 1, wherein said maintaining means comprises at least one Belleville type washer.

12. The chamber as set forth in claim 1, wherein said maintaining means is adapted to maintain said compressive spring force against said core irrespective of dimensional changes of said core.

13. The chamber set forth in claim 1, wherein said maintaining means is constructed and arranged to continuously exert a compressive spring force against a portion of said core.

14. A mixing chamber adapted to receive a plurality of fluid components from respective sources thereof for forming a foam to be discharged therefrom comprising, a core of deformable material having an axial bore longitudinally extending therethrough and a pair of inlet openings arranged in said core in communication with said bore for supplying said fluid components from said respective sources to said bore, inlet members inserted into said inlet openings within said core and constructed of nondeformable material so as to maintain the dimensions thereof during use of said chamber, a housing of nondeformable material surrounding said core, valving means movable within said bore between a first position in which said inlet members are uncovered to permit flow of said components into said bore and a second position in which said inlet members are covered to prohibit said flow, and maintaining means of nondeformable material for maintaining said core within said housing under a restraining force 15. The chamber as set forth in claim 14 wherein said pair of inlet openings are radially spaced from each other in the range of about 120 to 130 degrees.

16. The chamber as set forth in claim 14 wherein said pair of inlet openings are radially spaced from each other in the amount of approximately 125 degrees.

17. The chamber as set forth in claim 14 wherein said chamber is constructed and arranged to be removably secured in operative relationship with a control means of a dispensing apparatus in a manner to be detachable from the outside thereof.

18. The chamber as set forth in claim 14 further including a reservoir adapted to receive a solvent for said foam.

19. The chamber as set forth in claim 18 wherein such valving means comprises a longitudinally extending rod slideably arranged in interference fit within said bore and extending into said reservoir for contact with said solvent therein.

20. The chamber as set forth in claim 14 wherein said deformable material includes Teflon material and said nondeformable material includes metalic material.

21. The chamber as set forth in claim 14, wherein said maintaining means is constructed and arranged to continuously exert a compressive spring force against a portion of said core.

* * * * *